Oct. 5, 1954

E. WOLF 2,690,889

AUXILIARY CENTERING CAM FOR AIRPLANE
CROSS-WIND LANDING WHEELS

Filed May 24, 1951

2 Sheets—Sheet 1

INVENTOR.
Edward Wolf

BY
A H Oldham
ATTORNEY

INVENTOR.
Edward Wolf
BY
A. H. Pedham
ATTORNEY

Patented Oct. 5, 1954

2,690,889

UNITED STATES PATENT OFFICE 2,690,889

AUXILIARY CENTERING CAM FOR AIRPLANE CROSS-WIND LANDING WHEELS

Edward Wolf, Cuyahoga Falls, Ohio, assignor to Goodyear Aircraft Corporation, Akron, Ohio, a corporation of Delaware Application May 24, 1951, Serial No. 227,979

3 Claims. (Cl. 244—103)

This invention relates to a castering airplane cross-wind landing wheel and in particular to the centering cam arrangement therefor.

Hitherto it has been known to use for self-castering airplane cross-wind landing wheels a centering cam on which rests, when the airplane is on the ground, the full airplane weight and which has the tendency to keep the wheels in neutral position unless cross-wind forces hold them in castered position. However, as soon as the airplane becomes airborne, the wheels should automatically return from a castered position to neutral position, that is, assume a position parallel to the longitudinal axis of the airplane. This is essential, in order to avoid drag on non-retractable wheel installations and to provide proper clearance upon retraction into the wheel wells on retractable installations. It has been found, however, that for smaller caster angles, because of small cam slope near the cam center, the cam torque becomes insufficient to overcome the friction between cam and cam followers.

It is the general object of the invention to avoid and overcome the foregoing difficulties of and objections to prior art practices by the provision of means for automatically and positively restoring the landing wheels of an airplane from a castered position when rolling on the ground to a neutral position when becoming airborne.

The aforesaid object of the invention, and other objects which will become apparent as the description proceeds, are achieved by providing an auxiliary cam which cooperates with an auxiliary cam follower and begins to function before the slope on the main cam becomes too small to furnish the necessary torque for returning the landing wheels to neutral position. To achieve this, the active surfaces of the auxiliary cam are made sufficiently steep to furnish, when acted thereupon by the spring loaded cam follower slidingly mounted on the king pin, the required torque for centering the wheels.

Figure 1:
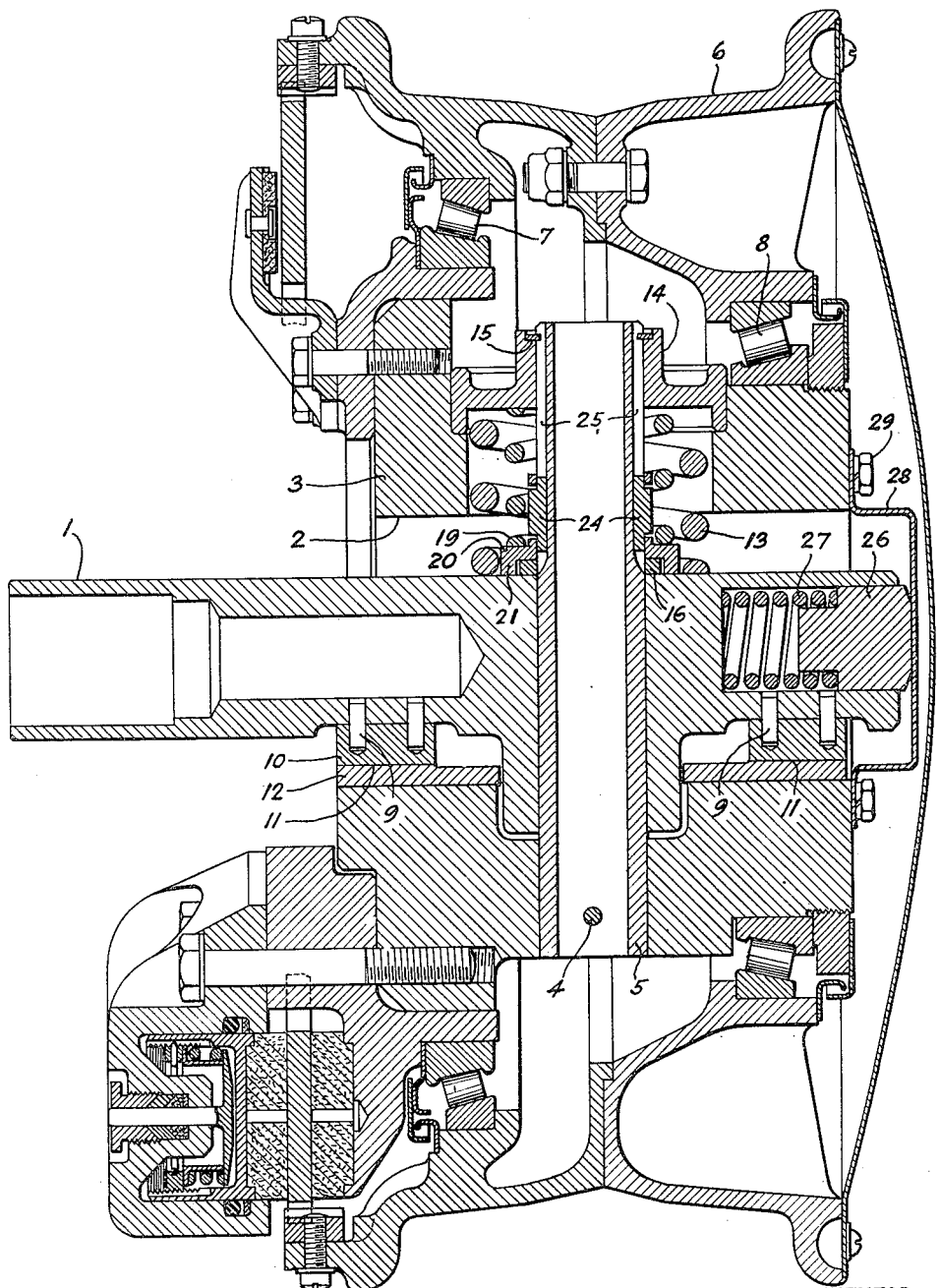
Figure 2:
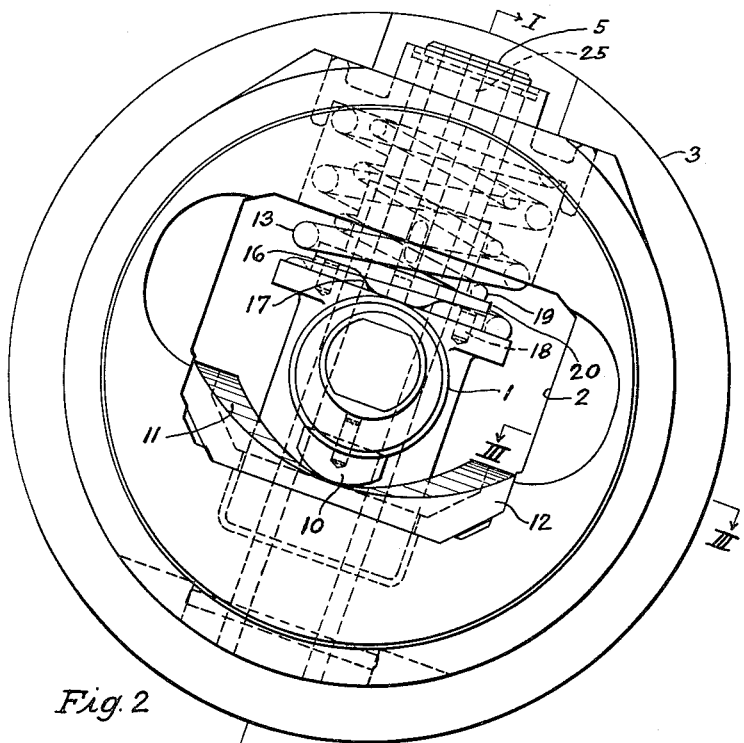
Figure 4:
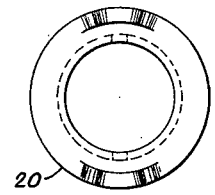
Figure 5:
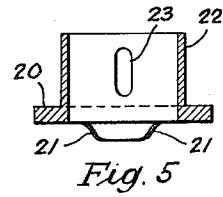
Figure 6:
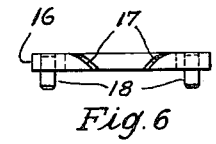
Figure 7:
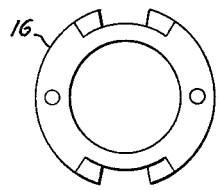
Figure 3:
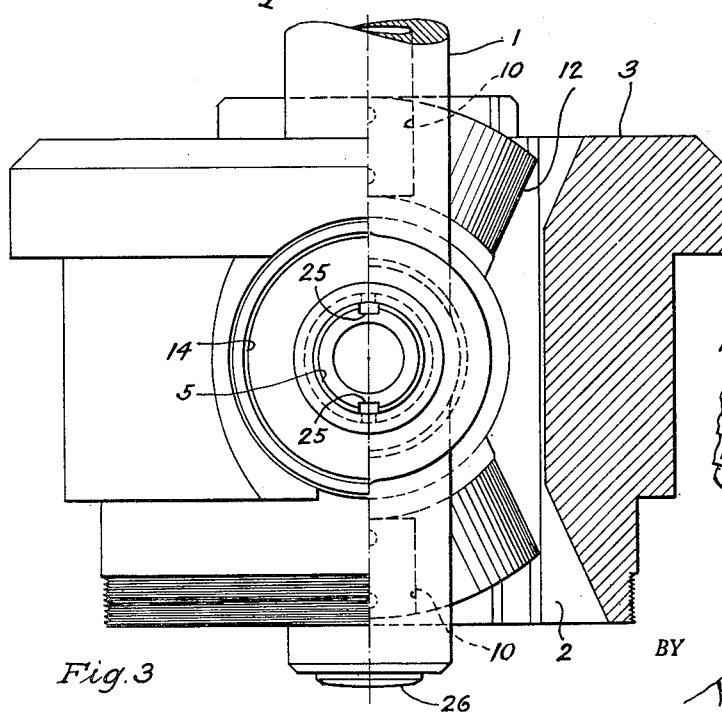
Figure 8:
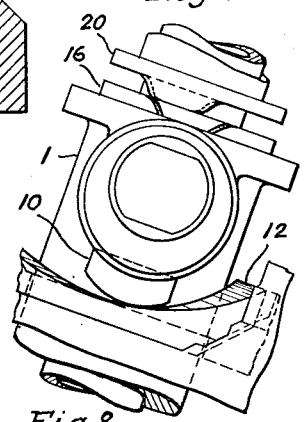

For a better understanding of the invention reference should be had to the accompanying drawing, wherein Fig. 1 is a cross-sectional vertical view taken on line I—I of Fig. 2, Fig. 2 is an end view of the wheel hub with bearings removed, Fig. 3 is a fragmentary top view of Fig. 2, showing one-half in cross-section taken on line III—III thereof, Fig. 4 is a bottom view of the auxiliary cam follower, Fig. 5 is a vertical cross-sectional view thereof, Fig. 6 is a side view of the auxiliary cam, Fig. 7 is a top view thereof, and Fig. 8 shows the position of the cam followers relative their respective cams at a caster angle when the auxiliary cam follower starts to engage its cam before friction on the main cam stops the wheel from completely returning to neutral position.

With specific reference to the form of the invention illustrated in the drawings, the numeral 1 indicates a landing wheel axle adapted to be attached to an airplane understructure (not shown) and which passes through an opening 2 in the wheel hub 3 radially spaced therefrom. In the hub 3 is diametrically mounted and secured therein by a pin 4, a king pin 5, pivotable in axle 1, at an angle with the vertical so that its axis intersects the ground in front of the wheel ground contact and permits the wheel 6, rotatable about hub 3 by means of bearings 7 and 8, to caster at cross-wind landings about king pin 5. To the bottom of axle 1 are attached and secured thereto by pins 9 cam followers 10 which ride on the relatively flat surfaces 11 of main cam 12 seated within the hub 3 at the bottom thereof. With the airplane on the ground, its full weight is transmitted by the cam followers 10 to the cam 12, whereas, when the airplane is airborne, the spring 13, seated between axle 1 and a retaining disk 14 fastened by a spring ring 15 to the top of king pin 5, forces cam 12 in the casterable hub 3 against the cam followers 10 of axle 1. With the airplane in ground contact and moving straight forwardly the cam action always tends to keep the wheels in neutral position, unless a cross-wind forces the airplane to yaw in which case the wheels will caster a certain angle. As soon as the airplane becomes airborne the spring 13 acting upon cam 12 normally will force the wheels from the caster position to neutral position. However, there is some difficulty in accomplishing this when the caster angle is small at which the slope on the cam is also small. Under such condition the frictional force between cam and cam follower may be greater than the torque force acting upon the cam, so that the wheels will not return to neutral position.

To overcome this drawback an auxiliary cam 16 provided with pairs of steep, suitably spaced, surfaces 17 is fixedly mounted concentrically with the king pin 5 by pins 18 to the top of the axle 1. Upon cam 16 rides under load of spring 19 the auxiliary cam follower 20 provided with surfaces 21 cooperating with the cam surfaces 17. The cylindrical portion 22 of the cam follower 20 carries in apertures 23 keys 24 extending into and being slidable in grooves 25 in the king pin 5. A friction element 26 inserted in the outer end of axle 1 is forced by a spring 27 against a drum segment 28 fastened by cap screws 29 to the hub 3 to dampen shimmying of the wheel when moving on the ground.

In operating the invention, an airplane while moving on the ground for taxiing or landing, the airplane load will always cause, with the assistance of the damping device, to keep the cam followers 10 in line with the longitudinal center line of main cam 12, but will caster the wheel when side forces of sufficient magnitude due to cross-wind are exerted against the airplane. However, when the airplane becomes airborne and the wheels cease to rotate they will usually not fully return from a small caster angle to neutral position because then the cam slope is also small so that the cam friction will not be overcome by the torque force. In this case, the auxiliary cam follower 20, when entering the cam depression formed between the steep surfaces 17, will produce the necessary torque to force the castered wheel into neutral position. To accomplish this, the relative position of the auxiliary cam follower 20 to that of the auxiliary cam 16 is made so that this cam arrangement will become active at a caster angle at which the main cam still produces a torque movement.

From the foregoing description it will be understood that the objects of the invention have been achieved to return the landing wheels from any castered position they have assumed on the ground to neutral position as soon as the airplane becomes airborne.

While certain representative embodiments and details have been shown for the purpose of illustrating the invention, it will be apparent to those skilled in the art that various changes and modifications may be made therein without departing from the spirit or scope of the invention.

What I claim:

1. In combination with a casterable airplane cross-wind main landing wheel, a hollow hub, an axle passing through and being radially spaced from said hub, a king pin pivotable in said axle at such an angle that its longitudinal axis intersects with the ground forwardly of the wheel ground contact and being fixed in diametrical position in said hub, a main centering cam of relatively flat curvature inserted within and at the bottom of said hub, cam followers attached to the bottom of said axle and bearing against said cam with the full weight of the airplane when on the ground, an auxiliary centering cam provided with pairs of spaced relatively steep active surfaces and being fixed to the top of said axle, an auxiliary cam follower in cooperative engagement with said auxiliary cam being keyed to and slidably movable longitudinally of the king pin, and springs inserted in and with their upper ends in fixed position relative said hub to force said main and auxiliary cams against their respective cam followers to produce a torque action upon said wheel to return it from a castered position when on the ground to a neutral position off-ground, said auxiliary cam assisting said main cam to overcome its friction at small cam slopes.

2. In combination with a freely castering airplane cross-wind main landing wheel rotatable about a hollow hub fixedly mounted to a king pin diametrically positioned therewith at an angle with the vertical so that its longitudinal axis intersects with the ground in front of the ground contact of the wheel and having an axle slidable along the king pin passing therethrough, the axle being radially spaced from the hub, a main centering cam fixedly seated in the hub underneath the axle and having relatively flat opposed slopes, cam follower means attached to the bottom of the axle and in engagement with the main cam to support the axle load with the airplane on the ground, an auxiliary centering cam having oppositely spaced, relatively steeply sloped, surfaces and being seated in fixed position on the axle, auxiliary cam follower means slidably keyed to the king pin and engageable with said steep cam slopes, and pressure springs disposed in the hub forcing together said cams and their respective cam follower means to return the wheel in the air from a castered position into neutral position, the torque forces caused by the steep slopes of the auxiliary cam overcoming the friction on the main cam when the main cam follower means approach the flat center of the main cam.

3. The combination in a casterable but self-centering airplane landing wheel of main cam and follower means carrying the weight of the airplane when on the ground and for moving the wheel to a near center position from a castered position when the airplane is in the air, and separate auxiliary cam and follower means only spring loaded for moving the wheel to a full center position from the near center position substantially only when the airplane is in the air.

References Cited in the file of this patent

UNITED STATES PATENTS

| Number | Name | Date |
| --- | --- | --- |
| 1,896,234 | Hathorn | Feb. 7, 1933 |
| 2,329,441 | Parker | Sept. 14, 1943 |
| 2,333,550 | Parker | Nov. 2, 1943 |
| 2,394,496 | Stephan | Feb. 5, 1946 |
| 2,504,077 | Loudenslager | Apr. 11, 1950 |
| 2,525,362 | Lucien | Oct. 10, 1950 |

FOREIGN PATENTS

| Number | Country | Date |
| --- | --- | --- |
| 883,921 | France | Apr. 5, 1943 |